Patented Feb. 27, 1951

2,543,341

UNITED STATES PATENT OFFICE 2,543,341

AROYLACETAMIDINE

James M. Smith, Jr., North Plainfield, and Barbara Roth, Middlesex, N. J., assignors to American Cyanamid Company, New York, N. Y., a corporation of Maine No Drawing. Application January 15, 1948, Serial No. 2,547

2 Claims. (Cl. 260—564)

The present invention relates to new organic compounds. More particularly it relates to aromatic acyl acetamidines and methods of preparing the same.

The new compounds of the present invention may be illustrated by the following general formula:

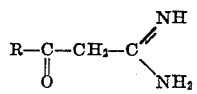

in which R is an aryl radical. Compounds are characterized as being crystalline solids, soluble in alcohols such as methanol, ethanol, propanol and the like. These new compounds are useful as intermediates in the preparation of 2-substituted pyrimidines such as 2-phenacylpyrimidines, described and claimed in our copending application, Serial Number 14,386, filed March 11, 1948, issued as Patent No. 2,487,391 on November 8, 1949.

Compounds having the above formula may be prepared by treating an aromatic acyl acetonitrile with anhydrous hydrogen chloride and an absolute alcohol suspended or dissolved in a suitable organic liquid such as benzene, toluene, xylene, etc. at a temperature of from about —10° C. to about 15° C. and treating the imino ester formed with alcoholic ammonia. The resulting aromatic acyl acetamidine may be used directly to prepare 2-phenacylpyrimidines or it may be isolated by precipitation with an organic compound, such as diethyl ether.

The aryl radical R of the general formula may be phenyl, naphthyl, etc. Also, these radicals may have one or more substituent groups such as chlorine, bromine, methyl, methoxy, nitro, and the like.

As solvents for the reaction there may be used trichloroethylene, ethylene dichloride, diethyl ether, dibutyl ether, chloroform, carbon disulfide, and other organic liquids which are substantially inert under the conditions of the reaction. In general, the presence of water is to be avoided as it tends to cause hydrolysis which interferes with obtaining the desired compound.

The reaction proceeds well at lower temperatures, however, it is desirable, in order to complete the reaction in a short time, that the mixture be allowed to warm to room temperature. The general reaction which we believe takes place can be illustrated by the following equation:

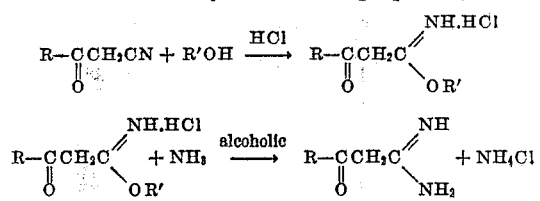

in which R is an aryl radical, and R' is a lower alkyl radical.

The invention will be illustrated in greater detail by means of the following example in which a representative aromatic acyl acetamidine is prepared. It is to be understood that this example is intended to illustrate the invention and is not in limitation thereof since, obviously, certain changes may be made therein by those skilled in the art.

To ten grams of benzoylacetonitrile dissolved in 50 ml. of dry benzene is added 12.1 ml. of absolute ethanol. The mixture is cooled to 0° C. and dry hydrogen chloride gas bubbled in until saturated. It is kept at 0° C. overnight and then allowed to warm to room temperature, at which time only a small amount of crystalline material is present in the liquor. After two hours at room temperature, the mixture is practically solid. The solid is filtered off, washed with benzene, and dried in the vacuum desiccator. It is then mixed with 50 ml. of alcoholic ammonia, which has been saturated with ammonia at 0° C. After standing for three days at room temperature, the mixture is filtered from the ammonium chloride. The alcohol is distilled off, and diethyl ether added to the syrupy residue, resulting in the precipitation of 7 g. of benzoylacetamidine. After two recrystallizations from water the substance melts at 188°–189° C.

We claim:

1. Compounds having the general formula:

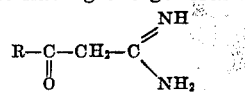

in which R is an aryl radical of the benzene series.

2. A compound having the formula:

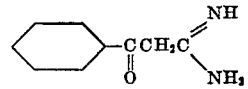

JAMES M. SMITH, JR.
BARBARA ROTH.

REFERENCES CITED

The following references are of record in the file of this patent:

UNITED STATES PATENTS

| Number | Name | Date |
|---|---|---|
| 2,149,457 | Miescher et al. | Mar. 7, 1939 |
| 2,310,789 | Hunt et al. | Feb. 9, 1943 |

OTHER REFERENCES

Haller: Bull. Soc. Chim., Paris, New Series, vol. 48 (1887), pp. 24–25.

Chemical Abstracts, vol. 21 (1927), p. 2902.

Richter: Organic Chemistry (1944), vol. I, pp. 328 and 329.